June 17, 1930. H. C. FIELD ET AL 1,763,695
WINDSHIELD REGULATOR
Filed Jan. 9, 1929   3 Sheets-Sheet 1
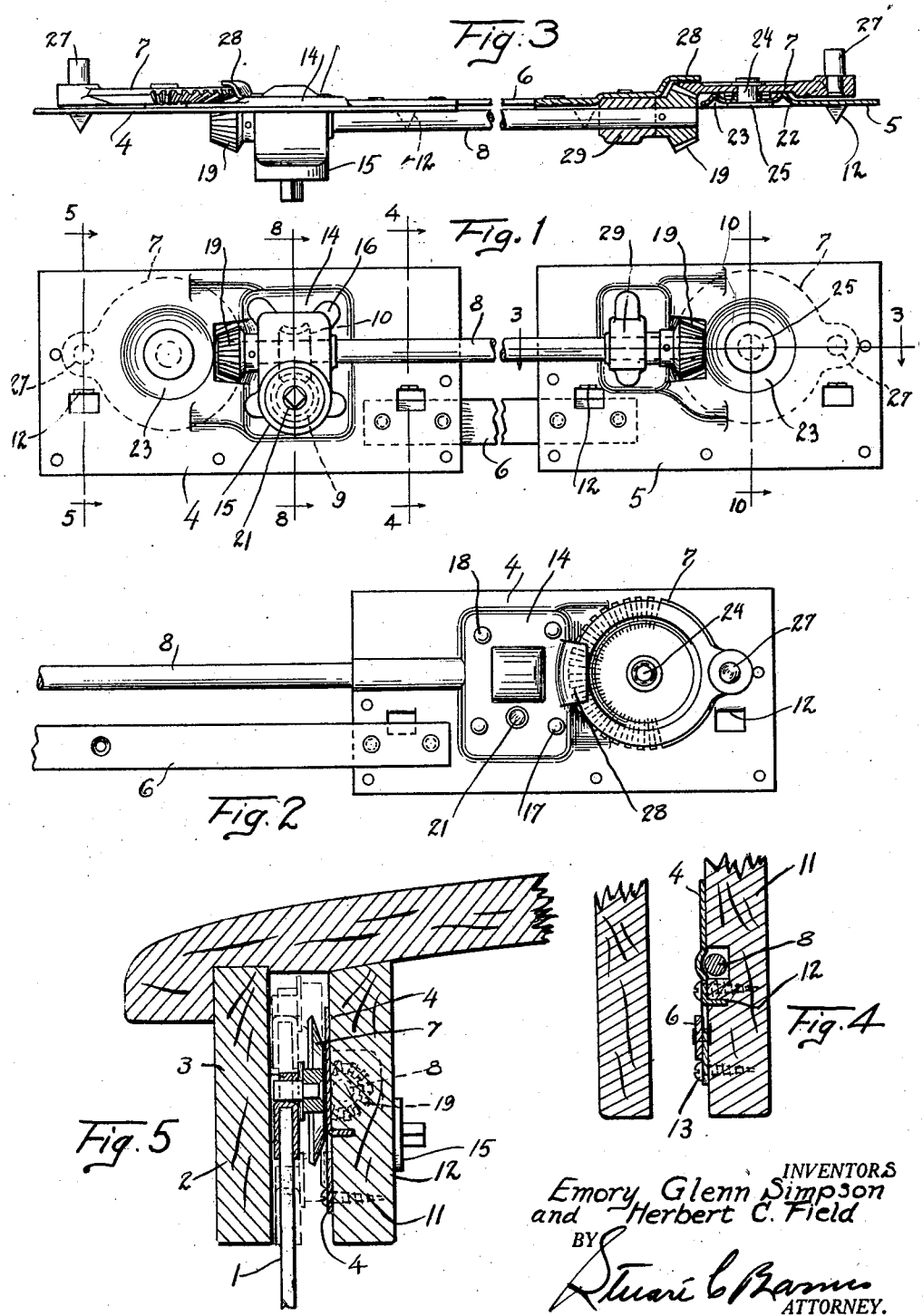
INVENTORS
Emory Glenn Simpson
and Herbert C. Field
BY
Stuart C. Barnes
ATTORNEY.

June 17, 1930.  H. C. FIELD ET AL  1,763,695
WINDSHIELD REGULATOR
Filed Jan. 9, 1929  3 Sheets-Sheet 2

INVENTORS
Emory Glenn Simpson
and Herbert C. Field
BY
ATTORNEY.

June 17, 1930.                H. C. FIELD ET AL                1,763,695
                              WINDSHIELD REGULATOR
                              Filed Jan. 9, 1929       3 Sheets-Sheet 3

INVENTORS
Emory Glenn Simpson and
Herbert C. Field
BY
ATTORNEY.

Patented June 17, 1930

1,763,695

UNITED STATES PATENT OFFICE

HERBERT C. FIELD, OF WINDSOR, ONTARIO, CANADA, AND EMORY GLENN SIMPSON, OF DETROIT, MICHIGAN, ASSIGNORS TO TERNSTEDT MANUFACTURING COMPANY, OF DETROIT, MICHIGAN, A CORPORATION OF MICHIGAN

WINDSHIELD REGULATOR

Application filed January 9, 1929. Serial No. 331,202.

This invention relates to a windshield regulator operated through bevel gears.

It is the object of this invention to provide a windshield regulator which is simple in construction and easily operated and whose parts are so assembled that they will not rattle while the automobile is in operation. Further, the regulator is so constructed that the windshield will maintain its position until the operator again operates the regulating mechanism.

In the drawings:

Fig. 1 is an elevation of the improved windshield regulator.

Fig. 2 is an obverse elevation of the driving end of the regulator.

Fig. 3 is a plan view of the windshield regulator partly in section taken on the line 3—3 of Fig. 1.

Fig. 4 is a section on the line 4—4 of Fig. 1.

Fig. 5 is a section on the line 5—5 of Fig. 1.

Figure 6:
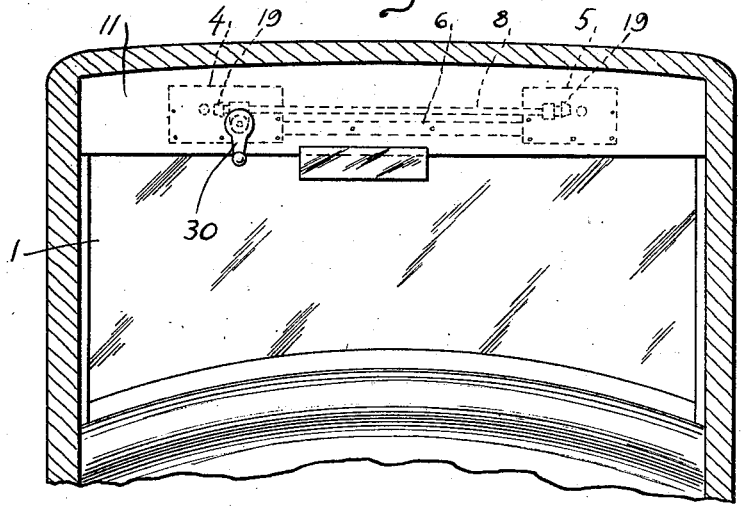
Fig. 6 is a front view of the inside of the header showing the window regulator in assembled position looking from the driver's seat.
Figure 7:
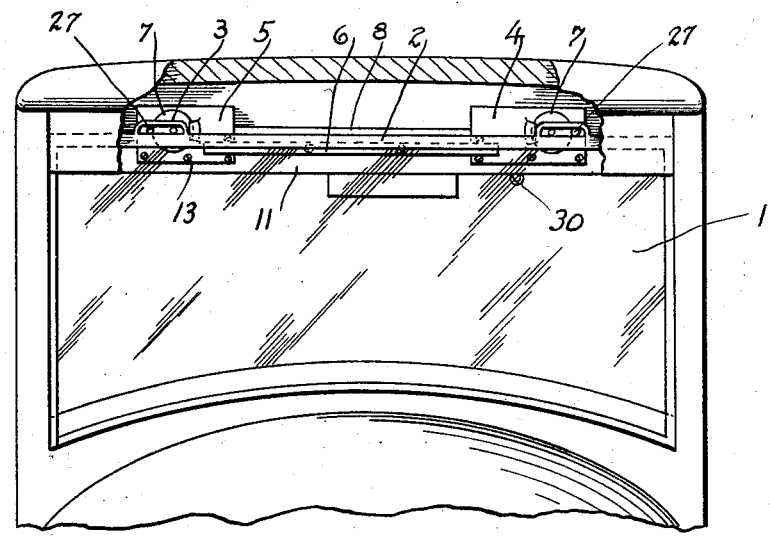
Fig. 7 is a front view with the windshield header partly broken away.
Figure 9:
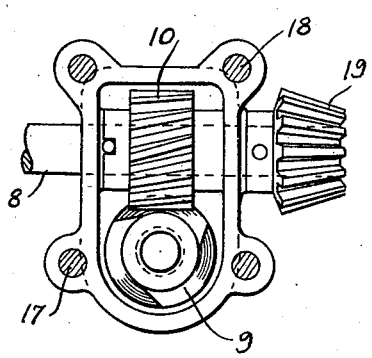
Fig. 9 is a section on the line 9—9 of Fig. 8.
Figure 8:
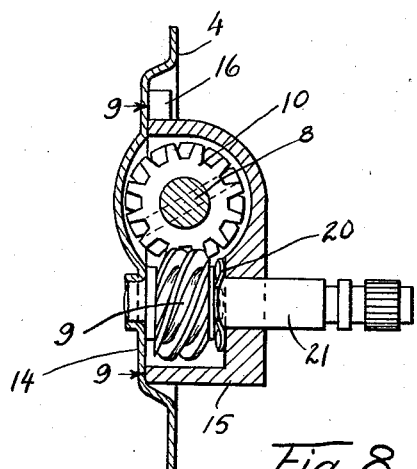
Fig. 8 is a section on the line 8—8 of Fig. 1.

Referring more particularly to the drawings, the windshield may be designated 1. Attached to the windshield is a top sash bar 2 to which are fixed the loop strips 3. The windshield is so constructed as to be movable upwardly and downwardly.

The window regulating mechanism proper consists of the plates 4 and 5 which are held in spaced relation by a spacer bar 6. Rotatably mounted upon each of the plates are the bevel gears 7, the mounting of which will be described below. These bevel gears are connected by the longitudinal shaft 8 which is adapted to be rotated by means of the worm 9 and a worm gear 10 which is mounted in fixed relation upon the longitudinal shaft 8.

The windshield regulator is adapted to be mounted upon the regulator board 11. To facilitate the mounting of the plates 4 and 5, each has struck therein the pointed teeth 12. These teeth are adapted to bite into the regulator board 11 and temporarily hold the regulator in place until permanently fixed to the regulator board by any such suitable means as the screws 13.

The plate 4 has punched therein the seat portion 14 for the die-cast worm gear housing 15. The worm gear housing is die-cast with the lugs 16 which are projected through the holes 17 in the housing seat 14 and riveted in any suitable manner as shown at 18, thereby positively connecting said housing to the plate 4.

Figure 11:
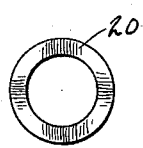
Fig. 11 shows a spring comprising a part of the regulator.
Figure 12:
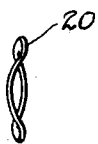
Fig. 12 is a view of the spring at right angles to the view in Fig. 11.

Attached to each end of the shaft 8 are the pinions 19 and between these pinions is positively mounted upon the shaft the worm gear 10 which meshes with the worm 9. The worm gear has teeth arranged at such a pitch as to make the drive reversible with difficulty, hence, the spring 20 is circumferentially mounted about the worm spindle 21 between the worm 9 and the housing 15. This spring creates sufficient friction to make the worm and worm gear practically irreversible. The spindle 21 is adapted to receive any suitable means such as a crank 30 by means of which the spindle may be rotated. The configuration of the spring member is shown in Figs. 11 and 12.

Figure 10:
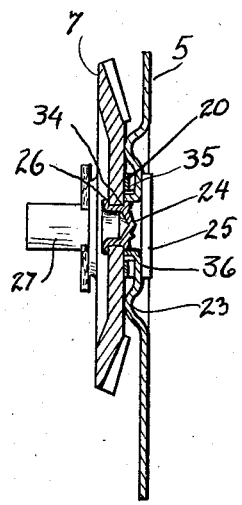
Fig. 10 is a section on the line 10—10 of Fig. 1.

As shown in Fig. 10, both plates 4 and 5 have a pressed-in annulus 23 which serves as an abutment for the bevel gears 7 each of which is mounted upon this pressed-in portion by means of a bearing stud 24 which has an enlarged head 25, a shoulder 34 against which the bevel gear 7 abuts, and the spun-over end 26. The annulus 23 and the bevel gear 7 cooperate to form a circular chamber in which is mounted a spring 35 of the same configuration, although larger than, the spring 20 which is shown in the Figs. 11 and 12. This spring 35 serves to hold the enlarged head 25 of the bearing stud tightly against the pressed-in portion of the plate as at 36 and thus prevents the bevel gear from rocking and rattling.

The bevel gears 7 are die-cast and are operatively connected to the windshield by means of the peripherally positioned crank pins 27 which are adapted to slidably fit within the loops 3 of the sash bar 2.

In order to hold the pinions 19 in mesh with the bevel gears 7, the plates have struck therein the lugs 28 which are formed to serve as guides for the bevel gears 7. The striking in of the lugs 28 provides openings in the position plates through which the pinions 19 and bevel gears 7 mesh.

The longitudinal shaft 8 is rotatably mounted in the die-cast housing 15 and in the die-cast bearing member 29 which is attached to the plate 5 by means of lugs similar to those which connect the worm gear housing to the plate 4.

What we claim is:

1. A windshield regulator for a windshield adapted to move upwardly and downwardly, consisting in combination of an apertured plate adapted to be mounted upon a stationary part of an automobile body, bevel gears rotatively mounted on one side of the plate, peripherally disposed crank pins on the bevel gears adapted to operatively connect said windshield and said bevel gears, a longitudinal shaft mounted on the other side of the plate having pinions which mesh with the aforesaid bevel gears through the apertures, and a worm gear circumferentially mounted upon said shaft, and a worm meshed with said worm gear for rotating the longitudinal shaft to raise or lower the windshield.

2. In a windshield regulator having a rotary shaft, the combination of a worm gear fixed to said shaft, a reversible worm operatively connected to said worm gear, a housing for said shaft, worm and worm gear, and resilient friction means in said housing for making said worm irreversible.

3. In a windshield regulator having a rotary shaft, the combination of a worm gear fixed to said shaft, a reversible worm operatively connected to said worm gear, a housing for said shaft, worm and worm gear, and resilient means in frictional engagement with said worm and said housing for making said worm irreversible.

4. In a windshield regulator, the combination of a rotary shaft with a pinion, a bevel gear, a support plate for said shaft and bevel gear, said support plate having a struck-in lug as a guide for said bevel gear and the pinion and bevel gear adapted to mesh in the opening created by said struck-in lug.

5. In a windshield regulator, the combination of a support plate having a pressed-in annulus, a gear rotatively mounted on said plate and adapted to slidably engage said annulus, and means for rotating said gear, the said annulus serving as an abutment to prevent rocking of the gear.

6. In a windshield regulator, a plate, a gear, a bearing stud with an enlarged head for rotatively mounting said gear on said plate, and resilient means between said gear and said plate for effecting a tight sliding engagement between said bearing stud head and said plate.

7. In a windshield regulator, an apertured support plate having a pressed-in seat, a housing for said seat, a shaft for said housing having a gear arranged to rotate transversely of said plate and mounted on one side of the plate, and a gear on the other side of the said plate arranged to rotate parallel to the said plate and at substantially right angles to the shaft gear and meshing with the said shaft gear through the opening in the support plate.

In testimony whereof we have affixed our signatures.

HERBERT C. FIELD.
EMORY GLENN SIMPSON.